(12) United States Patent
Clavette et al.

(10) Patent No.: US 11,898,458 B1
(45) Date of Patent: Feb. 13, 2024

(54) RADIAL FAN WITH LEADING EDGE AIR INJECTION

(71) Applicant: Hamilton Sundstrand Corporation, Charlotte, NC (US)

(72) Inventors: Jeremy Clavette, Tolland, CT (US); Viktor Kilchyk, Lancaster, NY (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 0 days.

(21) Appl. No.: 17/885,318

(22) Filed: Aug. 10, 2022

(51) Int. Cl.
| F01D 5/08 | (2006.01) |
| F01D 5/18 | (2006.01) |
| B33Y 80/00 | (2015.01) |
| B33Y 10/00 | (2015.01) |
| F01D 25/12 | (2006.01) |

(52) U.S. Cl.
CPC ............ *F01D 5/081* (2013.01); *F01D 5/187* (2013.01); *B33Y 10/00* (2014.12); *B33Y 80/00* (2014.12); *F01D 25/125* (2013.01); *F05D 2220/32* (2013.01); *F05D 2240/303* (2013.01); *F05D 2260/20* (2013.01)

(58) Field of Classification Search
CPC .......... F01D 5/081; F01D 5/082; F01D 5/085; F01D 5/087; F01D 25/125
See application file for complete search history.

(56) References Cited

U.S. PATENT DOCUMENTS

| 3,883,268 A | 5/1975 | Evans et al. |
| 4,807,433 A | 2/1989 | Maclin et al. |
| 5,113,670 A * | 5/1992 | McAuliffe ............ F01D 25/166 |
| | | 417/406 |
| 5,156,526 A * | 10/1992 | Lee .......................... F01D 5/187 |
| | | 416/97 R |
| 5,165,852 A * | 11/1992 | Lee .......................... F01D 5/187 |
| | | 416/97 R |
| 6,223,524 B1 * | 5/2001 | Durcan ................... F01D 5/225 |
| | | 416/190 |
| 6,224,327 B1 * | 5/2001 | Aoki ....................... F01D 5/085 |
| | | 415/114 |
| 6,491,495 B1 * | 12/2002 | Marushima ............... F02C 7/18 |
| | | 415/114 |
| 6,648,600 B2 * | 11/2003 | Takahashi ............... F01D 5/084 |
| | | 415/115 |
| 6,746,208 B2 * | 6/2004 | Marushima ............. F01D 5/084 |
| | | 415/114 |
| 7,186,085 B2 * | 3/2007 | Lee ......................... F01D 5/186 |
| | | 416/97 R |
| 7,445,433 B2 * | 11/2008 | Chivers ................. F01D 5/3061 |
| | | 416/193 A |

(Continued)

OTHER PUBLICATIONS

Extended European Search Report dated Nov. 8, 2023, for corresponding European Application No. 23189402.3.

*Primary Examiner* — Woody A Lee, Jr.
*Assistant Examiner* — Behnoush Haghighian
(74) *Attorney, Agent, or Firm* — Kinney & Lange, P.A.

(57) ABSTRACT

An integrally bladed rotor includes a rotor disk, rotor blade, internal channel and air outlets. The rotor blade includes a body defined by a pressure surface and suction surface between a leading edge and a trailing edge. The internal channel extends radially from the rotor disk internally within the body of the rotor blade. The air outlets are formed proximate the leading edge and extend within the body of the rotor blade to the internal channel.

19 Claims, 6 Drawing Sheets

(56) References Cited

U.S. PATENT DOCUMENTS

| | | | |
|---|---|---|---|
| 7,661,931 B1* | 2/2010 | Matheny | F01D 5/3053 |
| | | | 416/221 |
| 8,007,237 B2* | 8/2011 | Sreekanth | F01D 5/186 |
| | | | 415/115 |
| 8,079,802 B2* | 12/2011 | Takamura | F01D 5/087 |
| | | | 415/115 |
| 9,228,440 B2* | 1/2016 | Kollati | F01D 5/186 |
| 9,377,052 B2* | 6/2016 | McAuliffe | F16C 19/525 |
| 9,458,881 B2* | 10/2016 | McAuliffe | F16C 32/0696 |
| 9,784,126 B2* | 10/2017 | Army | F01D 25/166 |
| 9,874,239 B2* | 1/2018 | Beers | B64D 13/06 |
| 9,878,793 B2* | 1/2018 | Beers | F25B 9/004 |
| 10,107,109 B2 | 10/2018 | McCaffrey | |
| 10,514,065 B2* | 12/2019 | Army | F01D 21/12 |
| 10,718,265 B2* | 7/2020 | Stuart | F01D 25/16 |
| 10,935,037 B2* | 3/2021 | Bales | F04D 29/329 |
| 11,001,389 B2* | 5/2021 | Hinderliter | F04D 29/5806 |
| 11,002,146 B1* | 5/2021 | O'Neill | B64D 27/16 |
| 11,156,093 B2* | 10/2021 | Sidorovich Paradiso | |
| | | | F01D 25/02 |
| 11,448,083 B2* | 9/2022 | O'Neill | B60L 50/13 |
| 11,448,227 B2* | 9/2022 | Bales | F04D 29/329 |
| 11,530,617 B2* | 12/2022 | O'Neill | F01D 15/10 |
| 2008/0156943 A1* | 7/2008 | Sreekanth | F01D 5/186 |
| | | | 244/53 B |
| 2009/0324386 A1* | 12/2009 | Takamura | F02C 7/141 |
| | | | 415/115 |
| 2014/0154096 A1* | 6/2014 | Kollati | F01D 5/186 |
| | | | 29/889.721 |
| 2016/0138650 A1* | 5/2016 | McAuliffe | G08B 21/182 |
| | | | 384/103 |
| 2016/0186801 A1* | 6/2016 | McAuliffe | B64D 13/06 |
| | | | 340/584 |
| 2017/0102002 A1* | 4/2017 | Beers | F04D 25/024 |
| 2017/0108031 A1* | 4/2017 | Beers | B64D 13/06 |
| 2017/0167292 A1* | 6/2017 | Army | F01D 17/085 |
| 2017/0167541 A1* | 6/2017 | Army | F01D 21/12 |
| 2018/0340470 A1* | 11/2018 | Stuart | F16C 32/0614 |
| 2019/0211832 A1* | 7/2019 | Bales | B23P 15/006 |
| 2020/0172259 A1* | 6/2020 | Hinderliter | B64D 27/24 |
| 2020/0332658 A1 | 10/2020 | Sidorovich Paradiso et al. | |
| 2021/0180605 A1* | 6/2021 | Bales | C21D 9/50 |
| 2022/0127969 A1* | 4/2022 | O'Neill | F01D 15/10 |
| 2022/0127970 A1* | 4/2022 | O'Neill | F01D 15/10 |
| 2022/0356811 A1* | 11/2022 | O'Neill | B64D 27/24 |
| 2022/0356812 A1* | 11/2022 | O'Neill | B64D 35/02 |

* cited by examiner

RADIAL FAN WITH LEADING EDGE AIR INJECTION

CROSS-REFERENCE TO RELATED APPLICATION(S)

This application is related to U.S. application Ser. No. 17/885,319, filed on Aug. 10, 2022, entitled "LEADING EDGE AIR INLET COMPRESSOR ROTOR" and having the disclosure of which is incorporated by reference in its entirety.

BACKGROUND

This invention relates to integrally bladed rotors and, more specifically, flow dynamics of integrally bladed rotors.

An air cycle machine typically includes a fan section, a compressor section, a combustor section and a turbine section. The fan, compressor, and turbine sections include one or more circumferentially extending rows or stages of rotor blades, which may be carried on an integrally bladed rotor. Integrally bladed rotors have a rotor disk integrally joined to the rotor blades and can be used to increase aerodynamic efficiency of rotary machines. The rotor blades direct a working fluid as it moves through the rotor. As the working fluid passes over the rotor blade it can separate from laminar flow over the blade to turbulent flow near the blade. This separation and resultant turbulent flow reduces the efficiency of the overall rotary machine.

SUMMARY

In one aspect of the disclosure, an integrally bladed rotor for a RAM air fan includes a rotor disk and a plurality of rotor blades extending radially from the exterior rim surface of the rotor disk. The rotor disk includes a rim extending circumferentially about a center axis. The rim includes an interior rim surface and an exterior rim surface radially outward form the interior rim surface relative the central axis. A rotor blade of the plurality of rotor blades includes a body extending from a leading edge to a trailing edge. The rotor blade also includes a pressure surface formed on the body that extends from the leading edge to the trailing edge and a suction surface formed on the body opposite of the pressure surface that extends from the leading edge to the trailing edge. The rotor blade also includes an inner channel inside of the body of the rotor blade and extending radially within the rotor blade and a plurality of air outlets formed proximate the leading edge of the rotor blade and extending into the body to the internal channel.

In another aspect of the disclosure, an air cycle machine includes a turbine section including a turbine rotor, a compressor section including a compressor rotor, a fan section including an integrally bladed rotor, and a tie rod connected to the turbine rotor, the compressor rotor, and the integrally bladed rotor. The integrally bladed rotor includes a rotor disk and a rotor blade extending radially from the exterior rim surface of the rotor disk. The rotor disk includes a rim extending circumferentially about a center axis. The rim includes an interior rim surface and an exterior rim surface radially outward from the interior rim surface relative the center axis. The rotor blade also includes a pressure surface formed on the body and extending from the leading edge to the trailing edge and a suction surface formed on the body opposite of the pressure surface and extending from the leading edge to the trailing edge. The rotor blade also includes an inner channel inside of the body of the rotor blade and extending radially within the rotor blade. A plurality of air outlets is formed proximate the leading edge of the rotor blade and extends into the body to the internal channel.

In another aspect of the disclosure, a method of manufacturing an integrally bladed rotor for a RAM air fan is disclosed. The method includes additively manufacturing at least one rotor blade. The at least one rotor blade includes a body having a leading edge, a trailing edge aft of the leading edge, a pressure surface extending between the leading edge and the trailing edge, and a suction surface extending between the leading edge and the trailing edge opposite the pressure surface. The at least one rotor blade also includes an internal channel extending radially within the body of the at least one rotor blade from the interior rim surface. The at least one rotor blade also includes a plurality of air outlets formed on the body proximate to the leading edge and extending into the body to fluidically connect with the internal channel.

DETAILED DESCRIPTION

Figure 1:
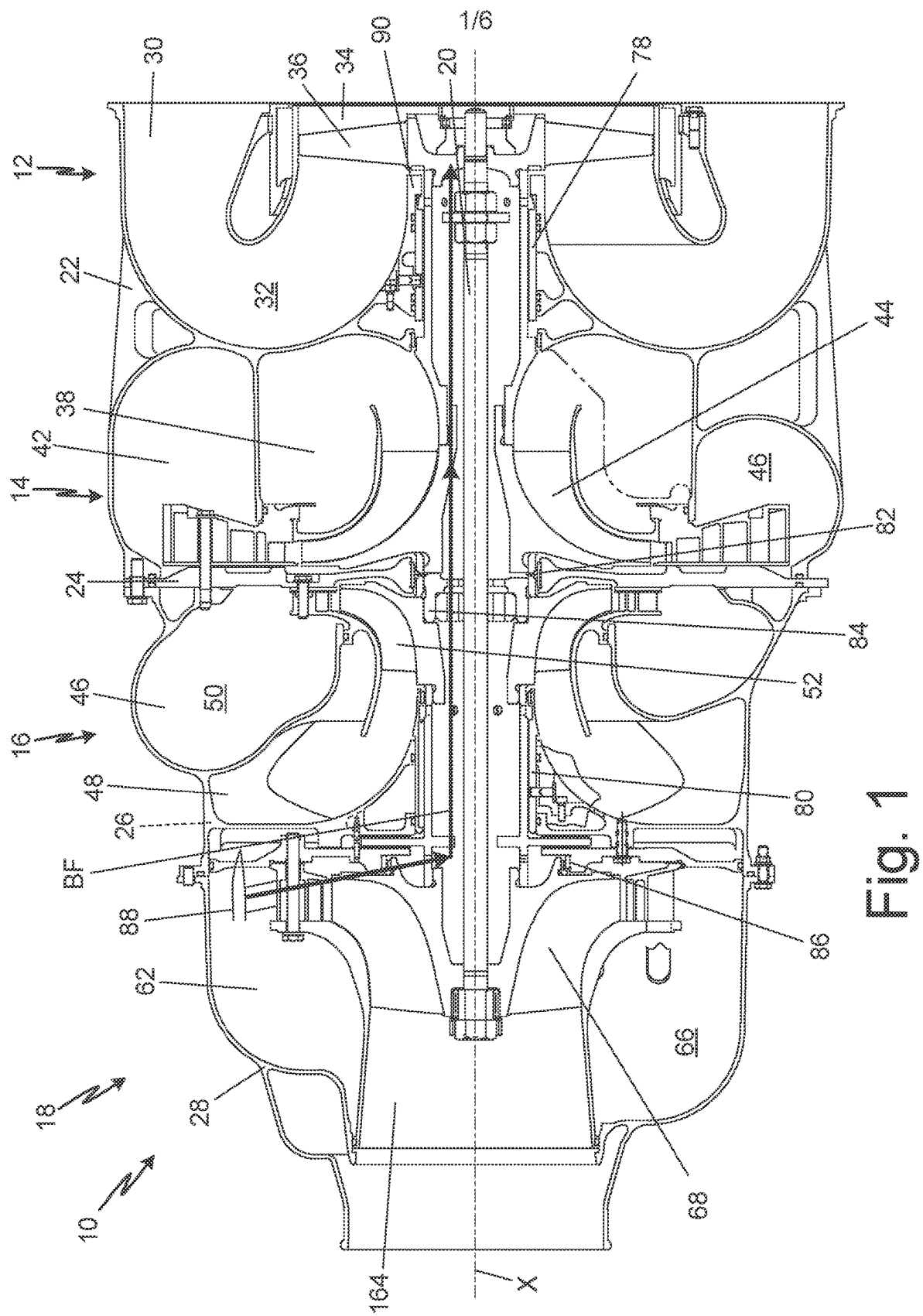
FIG. 1 is a cross-sectional view of an air cycle machine including a fan section.

FIG. 1 is a cross-sectional view of air cycle machine 10, which includes fan section 12, compressor section 14, first turbine section 16, second turbine section 18, tie rod 20, fan and compressor housing 22, seal plate 24, first turbine housing 26, and second turbine housing 28. Fan section 12 includes fan inlet 30, fan duct 32, fan outlet 34, and integrally bladed rotor 36. Compressor section 14 includes compressor inlet 38, compressor outlet 40, compressor duct 42, and compressor rotor 44. First turbine section 16 includes first turbine inlet 46, first turbine outlet 48, first turbine duct 50, and first turbine rotor 52. Second turbine section 18 includes second turbine inlet 62, second turbine outlet 64, second turbine duct 66, and second turbine rotor 68. Air cycle machine 10 further includes first journal bearing 78, second journal bearing 80, compressor rotor bearing 82, first turbine rotor bearing 84, and second turbine rotor bearing 86. Air cycle machine 10 also includes fan rotor bearing 90. Also shown in FIG. 1 is axis X.

In air cycle machine 10, fan section 12, compressor section 14, first turbine section 16, and second turbine section 18 are all mounted on tie rod 20. Tie rod 20 rotates about axis X. Fan and compressor housing 22 is connected to seal plate 24 and first turbine housing 26 with fasteners. First turbine housing 26 is connected to second turbine housing 28 with fasteners. Fan and compressor housing 22, first turbine housing 26, and second turbine housing 28 together form an overall housing for air cycle machine 10.

Fan and compressor housing 22 houses fan section 12 and compressor section 14. First turbine housing 26 houses first turbine section 16. Second turbine housing 28 houses second turbine section 18.

Fan section 12 includes fan inlet 30, fan duct 32, fan outlet 34, and integrally bladed rotor 36. Fan inlet 30 is connected to fan outlet 34 by fan duct 32. Integrally bladed rotor 36 is a fan rotor in fan duct 32 adjacent to fan outlet 34 and is mounted to and rotates with tie rod 20. Integrally bladed rotor 36 draws air into fan section 12 to be routed through air cycle machine 10. Fan section 12 draws in ram air from a ram air scoop or from another aircraft component like an associated gas turbine. The air drawn in enters a main flow path through air cycle machine 10. Air moves through fan duct 32 to fan outlet 34.

Compressor section 14 includes compressor inlet 38, compressor outlet 40, compressor duct 42, and compressor rotor 44. Compressor inlet 38 connects to compressor outlet 40 through compressor duct 42. Compressor rotor 44 is in compressor duct 42 and is mounted to and rotates with tie rod 20. Air follows the main flow path through compressor section 14 by entering compressor inlet 38. Compressor rotor 44 rotates and increases the velocity of the air. As the air moves through compressor duct 42 downstream of rotor 44, air velocity decreases and air pressure increases. Air exits compressor duct 42 through compressor outlet 40.

First turbine section 16 includes first turbine inlet 46, first turbine outlet 48, first turbine duct 50, and first turbine rotor 52. First turbine inlet 46 connects to first turbine outlet 48 through first turbine duct 50. First turbine rotor 52 is positioned in first turbine duct 50 and is mounted to and rotates tie rod 20. Air follows the main flow path into first turbine inlet 46 and is ducted through first turbine duct 50 to first turbine outlet 48. First turbine rotor 52 extracts energy from the air passing through first turbine section 16 following the main flow path. Extracted energy rotates tie rod 20. The air expands and cools following the main flow path through first turbine rotor 52.

Second turbine section 18 includes second turbine inlet 62, second turbine outlet 64, second turbine duct 66, and second turbine rotor 68. Second turbine inlet 62 connects to second turbine outlet 64 through second turbine duct 66. Second turbine rotor 68 is positioned in second turbine duct 66 and is mounted to and rotates tie rod 20. The majority of air follows the main flow path into second turbine inlet 62 and is ducted through second turbine duct 66 to second turbine outlet 64. The remaining air enters the cooling flow tapoff 88 and becomes air bearing cooling flow BF. Second turbine rotor 68 extracts energy from the air passing through second turbine section 18 and rotates tie rod 20. The air expands and cools moving through second turbine rotor 68.

Air cycle machine 10 further includes first journal bearing 78, second journal bearing 80, compressor rotor bearing 82, first turbine rotor bearing 84, and second turbine rotor bearing 86. First journal bearing 78 is positioned in fan section 12 and is supported by fan and compressor housing 22. A radially outer surface of a first rotating shaft abuts a radially inner surface of first journal bearing 78. Second journal bearing 80 is positioned in first turbine section 16 and is supported by first turbine housing 26. A radially outer surface of a second rotating shaft abuts a radially inner surface of second journal bearing 80. First journal bearing 78 and second journal bearing 80 support the first rotating shaft and the second rotating shaft, respectively.

Compressor rotor bearing 82, first turbine rotor bearing 84, and second rotor bearing 86 are journal bearings. Compressor rotor bearing 82 has a radially inner surface abutting compressor rotor 44 and a radially outer surface abutting seal plate 24. First turbine rotor bearing 84 has a radially inner surface abutting first turbine rotor 52 and a radially outer surface abutting seal plate 24. Second turbine rotor bearing 86 has a radially inner surface abutting second turbine rotor 68 and a radially outer surface abutting a portion of second turbine housing 28. Compressor rotor bearing 82 supports compressor rotor 44; first turbine rotor bearing 84 supports first turbine rotor 52; second turbine rotor bearing 86 supports second turbine rotor 68. Air cooling tapoff 88 forms an air bearing cooling flow path BF through air cycle machine 10 with an inlet in second turbine section 18 and an outlet in fan section 12. When air from second turbine section 18 enters air cooling tapoff 88 the air is directed in the air bearing cooling flow path BF across second turbine rotor bearing 86, second journal bearing 80, first turbine rotor bearing 84, compressor rotor bearing 82, first journal bearing 78, and fan rotor bearing 90 and cools those bearings. As discussed in greater detail below, a portion of the air directed through fan rotor bearing 90 will be directed into integrally bladed rotor 36.

Figure 2:
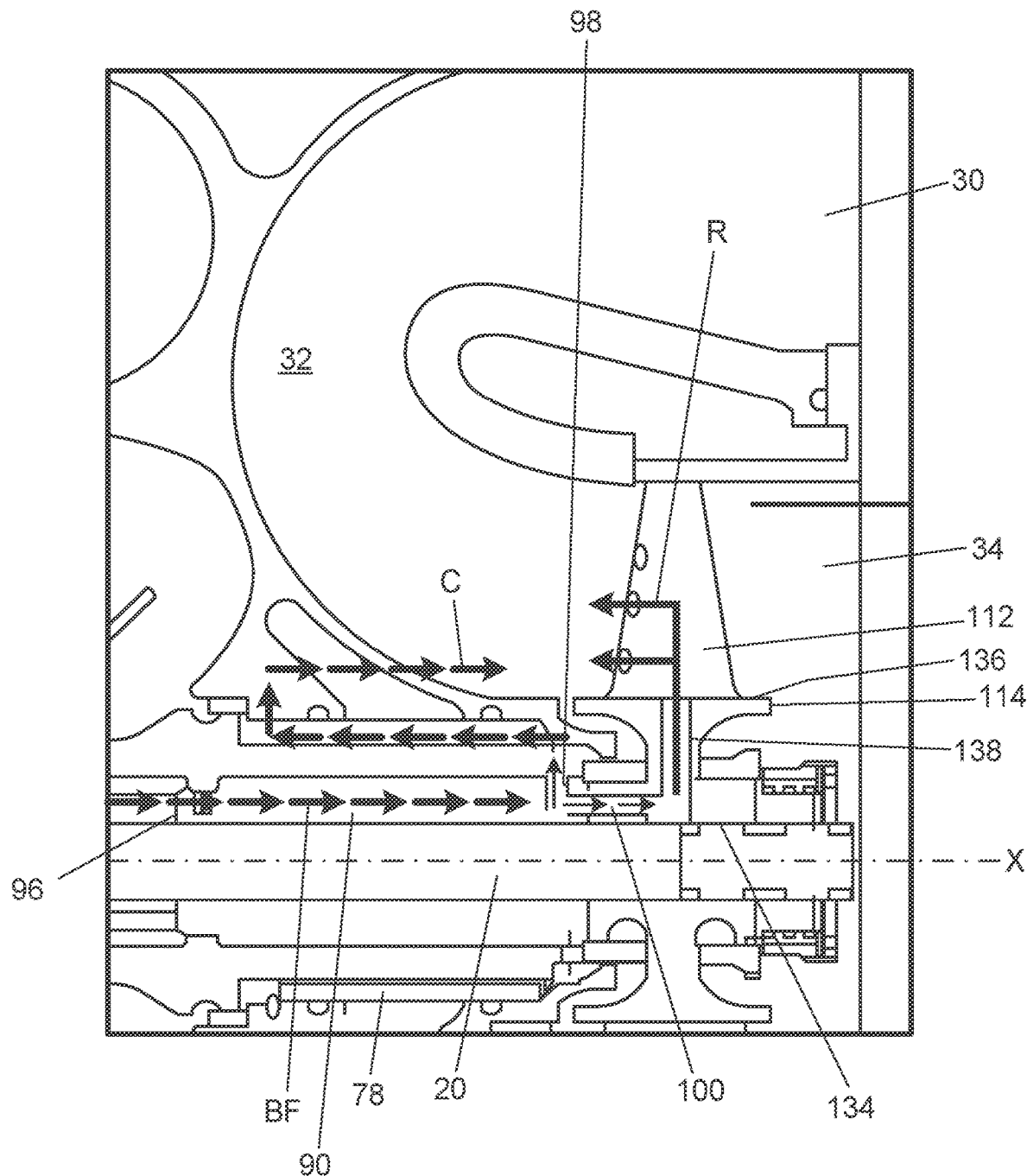
FIG. 2 is an enlarged cross-sectional view of the fan section of FIG. 1.

FIG. 2 is an enlarged cross-sectional view of fan section 12 from FIG. 1. Integrally bladed rotor 36 includes rotor disk 114 and blades 112. Rotor disk 114 includes radially inner interior rim surface 134 and radially outer exterior rim surface 136. Rotor disk 114 also includes inlet passage 138 extending from a side surface of rotor disk 114 radially between radially inner interior rim surface 134 and radially outer exterior rim surface 136. Inlet passage 138 extends to internal channel 130, discussed below. Blades 112 are formed integral to rotor disk 114. Fan rotor bearing 90 is an air bearing. Fan rotor bearing 90 includes bearing inlet hole 96, bearing duct outlet hole 98 and bearing rotor outlet hole 100. Bearing inlet hole 96 is fluidically connected to bearing duct outlet hole 98 and bearing rotor outlet hole 100 through fan rotor bearing 90. Fan rotor bearing 90 supports integrally bladed rotor 36.

When the air flowing in air cooling tapoff 88 reaches fan rotor bearing 90, the air enters bearing inlet hole 96 and flows through fan rotor bearing 90. Air bearing cooling flow path BF in fan section 12 separates into rotor inlet air R and cooling flow discharge air C. The cooling flow discharge air C flows through the bearing duct outlet hole 98 and is discharged into fan duct 34 where the cooling flow discharge air C reenters the main flow path. The rotor inlet air R flows through bearing rotor outlet hole 100. The rotor inlet air R then flows through integrally bladed rotor 36, as discussed below with reference to FIGS. 3 and 4.

Figure 3:
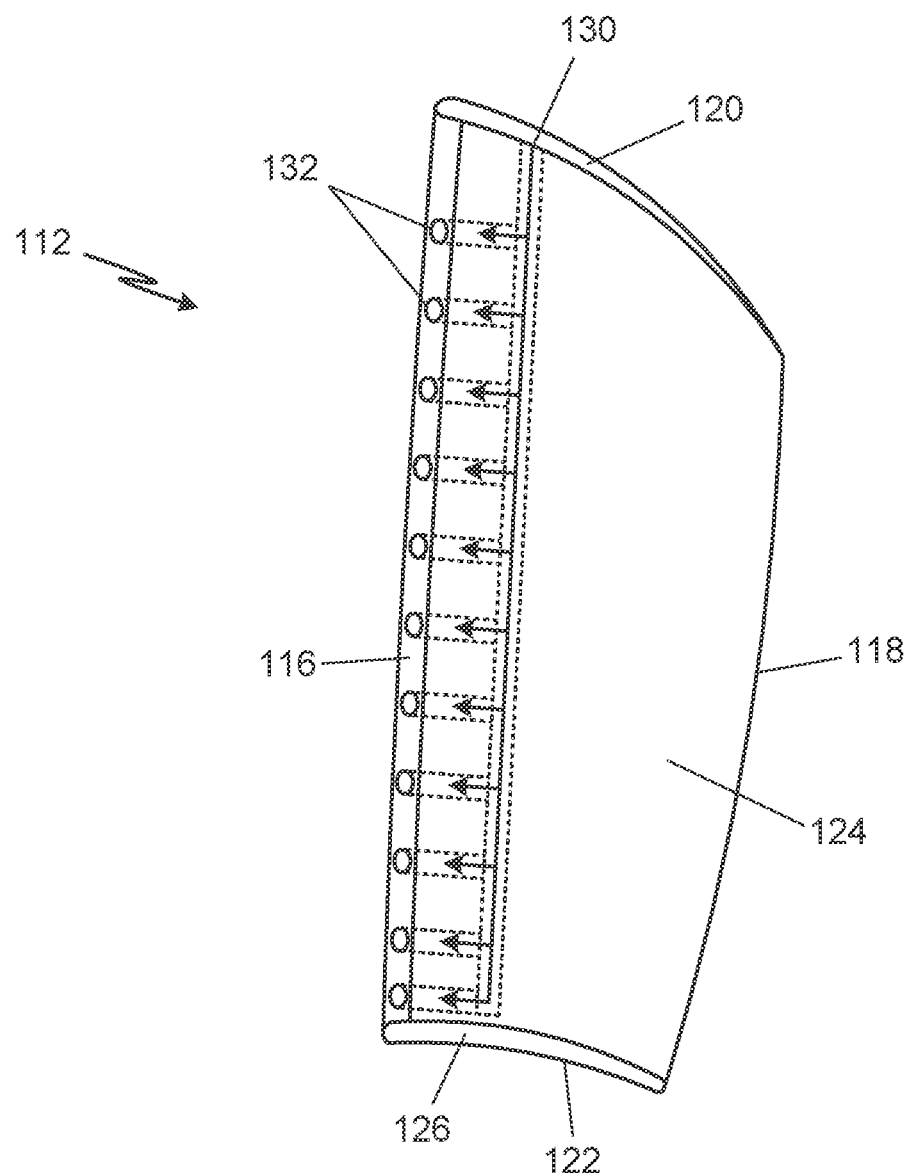
FIG. 3 is a perspective view of a rotor blade of the fan section of FIG. 1 with an internal channel shown in phantom and a plurality of air outlets.
Figure 4:
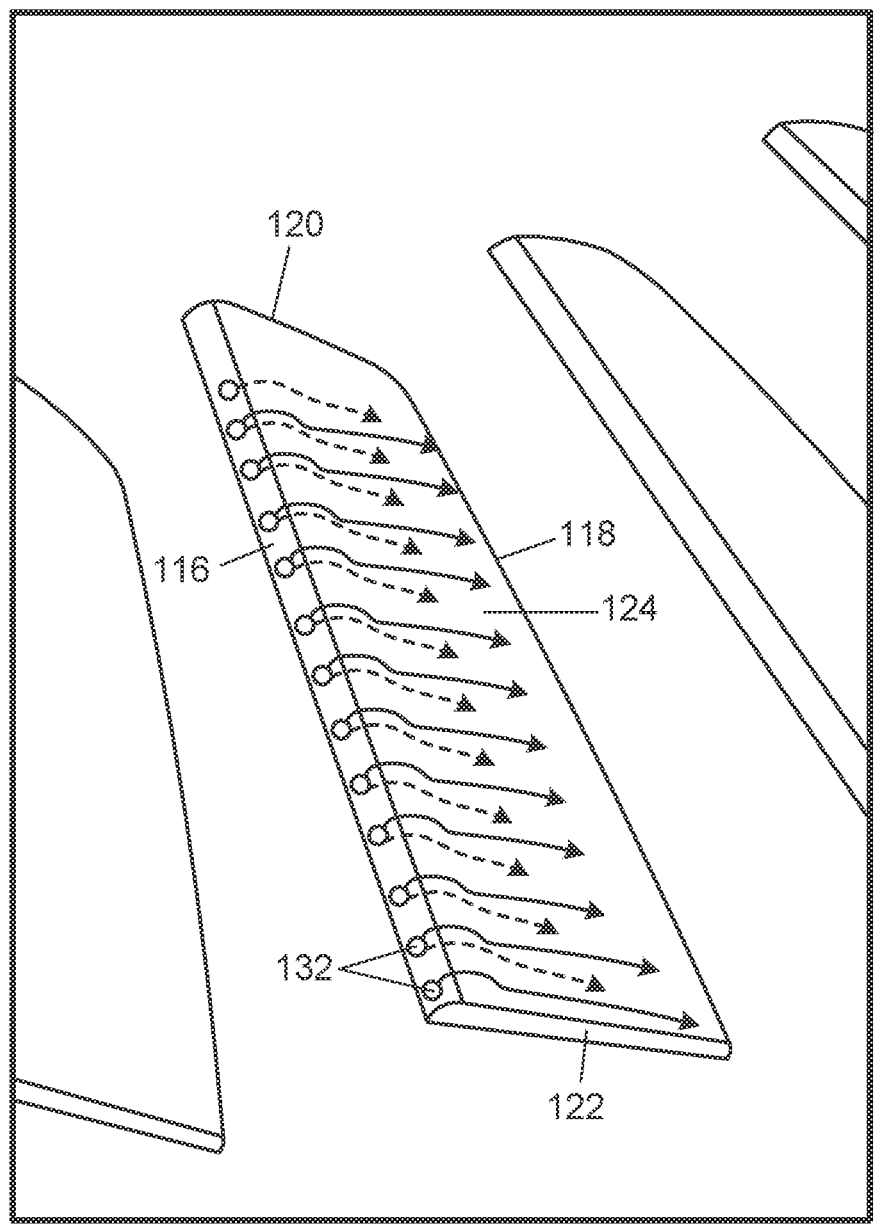
FIG. 4 is a perspective view of the rotor blade of FIG. 3 with fluid flow exiting the plurality of air outlets and flowing along the pressure surface and the suction surface.

FIGS. 3 and 4 will be discussed together. FIG. 3 is a perspective view of one of blades 112 from integrally bladed rotor 36 shown in FIG. 2. FIG. 4 is a perspective view of blades 112 showing air flow along blades 112. Each of blades 112 includes leading edge 116, trailing edge 118, base 120, tip 122, pressure surface 124, suction surface 126, body 128, internal channel 130, and air outlets 132. Body 128 of each blade 112 is formed by leading edge 116, trailing edge 118, pressure surface 124, and suction surface 126. Trailing edge 118 is aft of leading edge 116. Pressure surface 124 extends from leading edge 116 to trailing edge 118, and extends radially from base 120 to tip 122. Suction surface 126 extends from leading edge 116 to trailing edge 118 opposite of pressure surface 124 and also extends radially from base 120 to tip 122. Internal channel 130 extends radially outward from base 120 within body 128, and terminates within body 128 radially inward of tip 122. Air outlets 132 are formed proximate to leading edge 116 and extend into body 128 to fluidically connect with internal channel 130. Air outlets 132 can be evenly spaced on leading edge 116, as shown in FIG. 3. Rotor inlet air R flows through rotor disk 114 and enters internal channel 130 at base 120. The rotor inlet air R then flows through internal channel 130 and is discharged through air outlets 132 becoming discharged air DA. After discharging from air outlets 132, the discharged air DA then travels along body 128 and flows on pressure surface 124 and suction surface 126. The orientation of air outlets 132 can aid in directing the discharged air DA onto pressure surface 124 and suction surface 126. The flow of discharged air DA entrains air as integrally bladed rotor 36 rotates in fan duct 34, delaying separation from body 128 and thereby improving efficiency.

Figure 5:
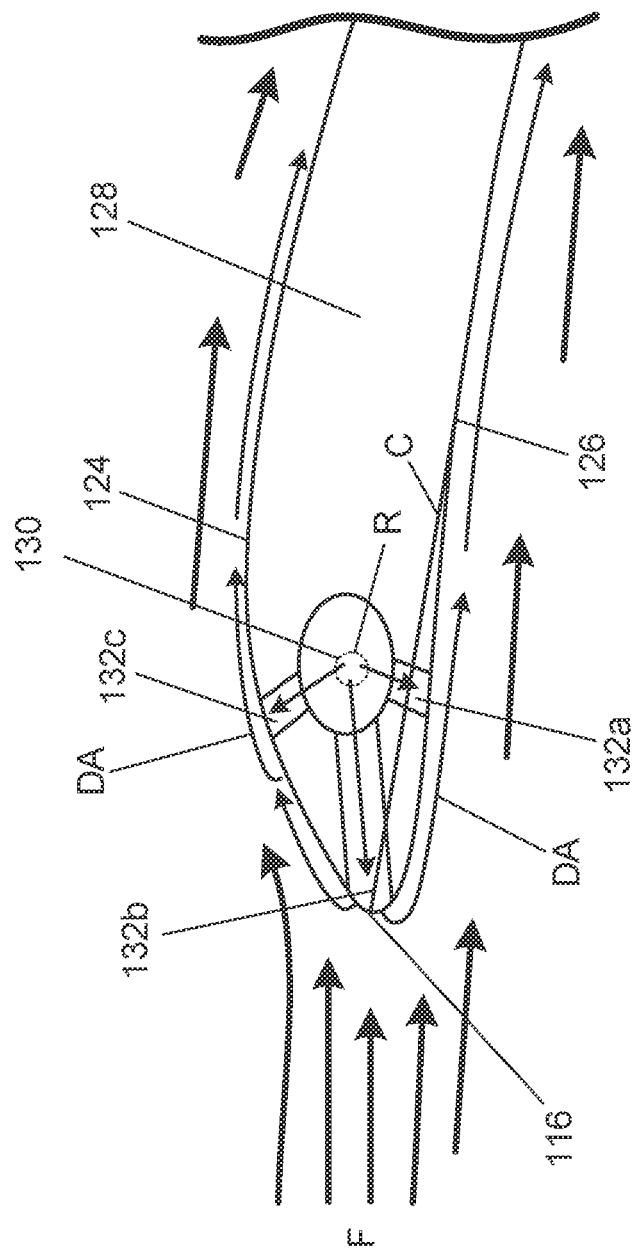
FIG. 5 is a cross-sectional view of another embodiment of the rotor blade with an internal channel and air outlets proximate to a leading edge.

FIG. 5 is a cross-sectional view of another embodiment of blades 112, showing air flow around body 128. Air outlet 132a can be formed proximate to leading edge 116 within fifteen percent of chord C on suction surface 126. Air outlet 132b can be formed on leading edge 116. Air outlet 132c can be formed proximate to leading edge 116 within fifteen percent of chord C on pressure surface 124. In other embodiments, air outlets 132 can be formed only on leading edge 116 or only within fifteen percent of chord C on either pressure surface 124 or suction surface 126. Air outlets 132 can also be formed in any combination of leading edge 116 and within fifteen percent of chord C on pressure surface 124 or suction surface 126. Rotor inlet air R flows through internal channel 130 and is discharged through air outlets 132 becoming discharged air DA. The location of air outlets 132 can determine the direction of discharged air DA. Discharged air DA emerging from air outlets 132 will tend to follow an adjacent surface due to the Coanda effect. Discharged air DA from air outlet 132a will follow suction surface 126, discharged air DA from air outlet 132c will follow pressure surface 124, and discharged air DA from air outlet 132b will follow pressure surface 124 and suction surface 126. Main flow F meets body 128 at leading edge 116 and can then flow along pressure surface 124 and suction surface 126. Discharged air DA follows pressure surface 124 and suction surface 126. When main flow F reaches pressure surface 124 and suction surface 126, main flow F will be entrained by discharged air DA. Main flow F being entrained by discharged air DA delays the separation of main flow F from body 128, keeping main flow F laminar for longer than main flow F would remain laminar in the absence of discharged air DA. Laminar flow along body 128 is more efficient than turbulent flow, and discharged air DA entraining main flow F increases the efficiency of integrally bladed rotor 36. Controlling the direction of discharged air DA via spacing and profile of air outlets 132 can change the efficiency of integrally bladed rotor 36.

Figure 6:
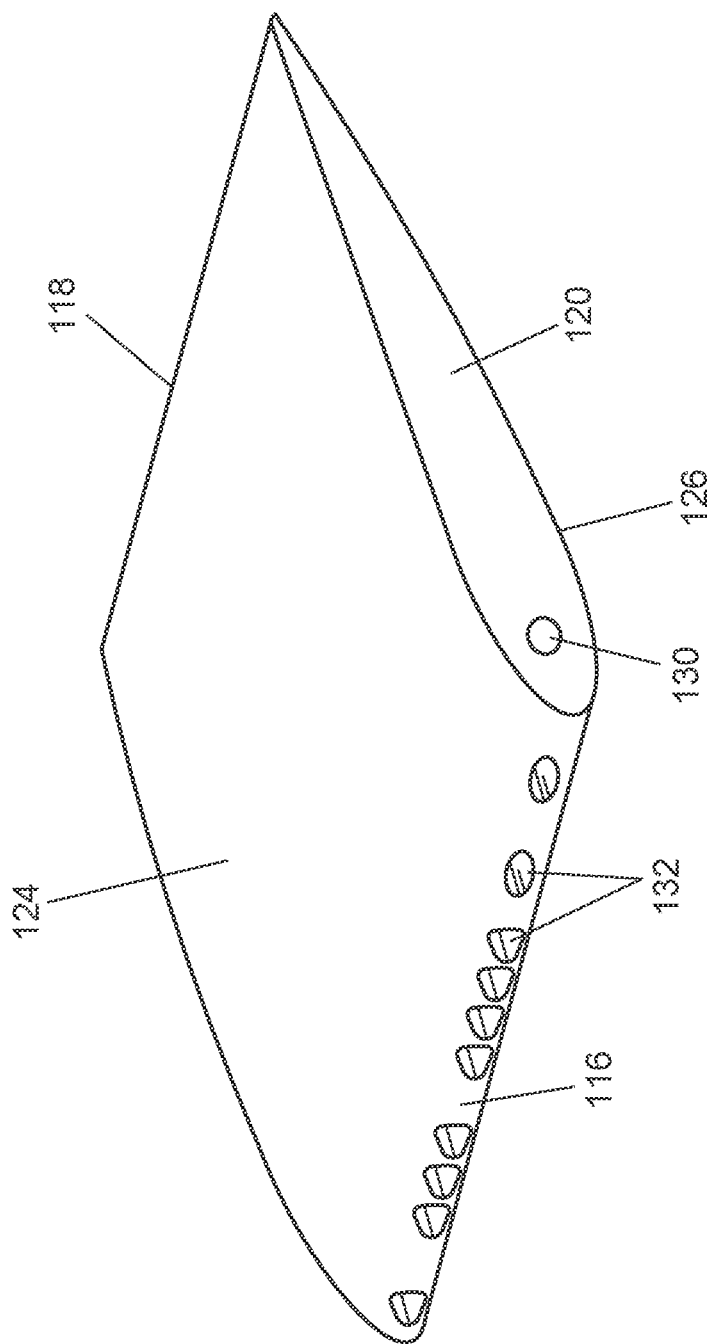
FIG. 6 is a perspective view of another embodiment of the rotor blade with air outlets of varying spacing and profile.

FIG. 6 is a perspective view of blades 112 showing exemplary orientations of air outlets 132. In the embodiment of FIG. 6, air outlets 132 can be irregularly spaced on leading edge 116. In an alternate embodiment, air outlets 132 can be located within fifteen percent of chord C on pressure surface 124 and suction surface 126. Air outlets 132 can also include circular, elliptical, and/or non-circular profiles. In an alternate embodiment, air outlets 132 can be formed from a porous foam material with pores and passages in fluidic communication with internal channel 130. The spacing, profile, and direction of air outlets 132 can be chosen to increase efficiency of an air machine through delaying the separation of air around blades 112. Blades 112 can be additive manufactured to allow for the creation of internal channel 130 and air outlets 132.

Discussion of Possible Embodiments

The following are non-exclusive descriptions of possible embodiments of the present invention.

In one embodiment, an integrally bladed rotor for a RAM air fan includes a rotor disk and a plurality of rotor blades extending radially from the exterior rim surface of the rotor disk. The rotor disk includes a rim extending circumferentially about a center axis. The rim includes an interior rim surface and an exterior rim surface radially outward form the interior rim surface relative the central axis. A rotor blade of the plurality of rotor blades includes a body extending from a leading edge to a trailing edge. The rotor blade also includes a pressure surface formed on the body that extends from the leading edge to the trailing edge and a suction surface formed on the body opposite of the pressure surface that extends from the leading edge to the trailing edge. The rotor blade also includes an inner channel inside of the body of the rotor blade and extending radially within the rotor blade and a plurality of air outlets formed proximate the leading edge of the rotor blade and extending into the body to the internal channel.

The integrally bladed rotor of the preceding paragraph can optionally include, additionally and/or alternatively, any one or more of the following features, configurations and/or additional components:

A further embodiment of the foregoing integrally bladed rotor, wherein the rotor disk further includes an inlet passage formed in the rotor disk where the inlet passage extends from a side surface of the rotor disk radially between the interior rim surface and the exterior rim surface to the internal channel.

A further embodiment of any of the foregoing integrally bladed rotors wherein at least one of the air outlets comprises a circular profile.

A further embodiment of any of the foregoing integrally bladed rotors wherein at least one of the air outlets comprises an elliptical profile.

A further embodiment of any of the foregoing integrally bladed rotors wherein the plurality of air outlets is evenly spaced on the leading edge.

A further embodiment of any of the foregoing integrally bladed rotors wherein the plurality of air outlets is irregularly spaced on the leading edge.

A further embodiment of any of the foregoing integrally bladed rotors wherein the plurality of air outlets is irregularly spaced on the leading edge.

A further embodiment of any of the foregoing integrally bladed rotors wherein at least one air outlet of the plurality of air outlets is on the leading edge.

A further embodiment of any of the foregoing integrally bladed rotors wherein at least one air outlet of the plurality of air outlets extends from the internal channel to the pressure surface within fifteen percent of chord from the leading edge.

A further embodiment of any of the foregoing integrally bladed rotors wherein at least one air outlet of the plurality of air outlets extends from the internal channel to the suction surface within fifteen percent of chord from the leading edge.

A further embodiment of any of the foregoing integrally bladed rotors wherein the plurality of air outlets comprises a first air outlet on the leading edge and extending to the internal channel, a second air outlet on the suction surface within fifteen percent of chord from the leading edge and extending to the internal channel and a third air outlet on the pressure surface within fifteen percent of chord from the leading edge and extending to the internal channel.

A further embodiment of any of the foregoing integrally bladed rotors wherein the internal channel is of a greater diameter than each of the plurality of air outlets.

A further embodiment of any of the foregoing integrally bladed rotors wherein an air cycle machine comprises a fan section including the integrally bladed rotor, a turbine section including a turbine rotor, a compressor section axially between the fan section and turbine section and including a compressor rotor, a tie rod connected to the turbine rotor, the compressor rotor, and the integrally bladed rotor, at least one bearing assembly supporting the tie rod relative to a stationary structure of the air cycle machine and a bleed air passage comprising a bleed air inlet in the turbine section and a bleed air outlet in the fan section wherein the bleed air outlet is fluidically connected to the inlet passage, and wherein the bleed air passage extends across the at least one bearing assembly.

In another embodiment, an air cycle machine includes a turbine section including a turbine rotor, a compressor section including a compressor rotor, a fan section including an integrally bladed rotor, and a tie rod connected to the turbine rotor, the compressor rotor, and the integrally bladed rotor. The integrally bladed rotor includes a rotor disk and a rotor blade extending radially from the exterior rim surface of the rotor disk. The rotor disk includes a rim extending circumferentially about a center axis. The rim includes an interior rim surface and an exterior rim surface radially outward from the interior rim surface relative the center axis. The rotor blade also includes a pressure surface formed on the body and extending from the leading edge to the trailing edge and a suction surface formed on the body opposite of the pressure surface and extending from the leading edge to the trailing edge. The rotor blade also includes an inner channel inside of the body of the rotor blade and extending radially within the rotor blade. A plurality of air outlets is formed proximate the leading edge of the rotor blade and extends into the body to the internal channel.

The air cycle machine of the preceding paragraph can optionally include, additionally and/or alternatively, any one or more of the following features, configurations and/or additional components:

A further embodiment of the foregoing air cycle machine wherein the air cycle machine includes at least one bearing assembly supporting the tie rod relative to a stationary structure of the air cycle machine. The air cycle machine further includes a bleed air passage with a bleed air inlet in the turbine section and a bleed air outlet in the fan section. The bleed air outlet is fluidically connected to the internal channel and the bleed air passage extends across the at least one bearing assembly.

A further embodiment of any of the foregoing air cycle machines including an inlet passage formed in the rotor disk wherein the inlet passage extends from the internal channel to a side surface of the rotor disk radially between the interior rim surface and the exterior rim surface and wherein the inlet passage fluidically connects the bleed air passage to the internal channel.

A further embodiment of any of the foregoing air cycle machines wherein the plurality of air outlets includes a first air outlet on the leading edge and extending to the internal channel; a second air outlet on the suction surface within fifteen percent of chord from the leading edge and extending to the internal channel; and a third air outlet on the pressure surface within fifteen percent of chord from the leading edge and extending to the internal channel.

A further embodiment of any of the foregoing air cycle machines wherein at least one air outlet of the plurality of air outlets is on the leading edge.

A further embodiment of any of the foregoing air cycle machines wherein at least one air outlet of the plurality of air outlets extends from the internal channel to the pressure surface within fifteen percent of chord.

A further embodiment of any of the foregoing air cycle machines wherein at least one air outlet of the plurality of air outlets extends from the internal channel to the suction surface within fifteen percent of chord from the leading edge.

In another embodiment, a method of manufacturing an integrally bladed rotor for a RAM air fan is disclosed. The method includes additively manufacturing at least one rotor blade. The at least one rotor blade includes a body having a leading edge, a trailing edge aft of the leading edge, a pressure surface extending between the leading edge and the trailing edge, and a suction surface extending between the leading edge and the trailing edge opposite the pressure surface. The at least one rotor blade also includes an internal channel extending radially within the body of the at least one rotor blade from the interior rim surface. The at least one rotor blade also includes a plurality of air outlets formed on the body proximate to the leading edge and extending into the body to fluidically connect with the internal channel.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. An air cycle machine comprises:
   an integrally bladed rotor in a ram air fan of the air cycle machine, the integrally bladed rotor comprising:
      a rotor disk comprising a rim extending circumferentially about a center axis, wherein the rim comprises an interior rim surface and an exterior rim surface radially outward from the interior rim surface relative the center axis;
      a plurality of rotor blades extending radially outward from the exterior rim surface of the integrally bladed rotor, wherein a rotor blade of the plurality of rotor blades comprises:
         a body extending from a leading edge to a trailing edge;
         a pressure surface formed on the body and extending from the leading edge to the trailing edge; and
         a suction surface formed on the body opposite of the pressure surface and extending from the leading edge to the trailing edge;
      an internal channel inside of the body of the rotor blade and extending radially within the rotor blade; and
      a plurality of air outlets formed proximate the leading edge of the rotor blade and extending into the body and fluidically connected to the internal channel.

2. The air cycle machine of claim 1, further comprising:
   an inlet passage formed in the rotor disk, wherein the inlet passage extends from a side surface of the rotor disk to the internal channel, and wherein the side surface is radially between the interior rim surface and the exterior rim surface.

3. The air cycle machine of claim 1, wherein at least one of the air outlets comprises a circular profile.

4. The air cycle machine of claim 1, wherein at least one of the air outlets comprises an elliptical profile.

5. The air cycle machine of claim 1, wherein the plurality of air outlets is evenly spaced on the leading edge.

6. The air cycle machine of claim 1, wherein the plurality of air outlets is irregularly spaced on the leading edge.

7. The air cycle machine of claim 1, wherein at least one air outlet of the plurality of air outlets is on the leading edge.

8. The air cycle machine of claim 1, wherein at least one air outlet of the plurality of air outlets extends from the internal channel to the pressure surface within fifteen percent of chord from the leading edge.

9. The air cycle machine of claim 1, wherein at least one air outlet of the plurality of air outlets extends from the internal channel to the suction surface within fifteen percent of chord from the leading edge.

10. The air cycle machine of claim 1, wherein the plurality of air outlets comprises:
a first air outlet on the leading edge and extending to the internal channel;
a second air outlet on the suction surface within fifteen percent of chord from the leading edge and extending to the internal channel; and
a third air outlet on the pressure surface within fifteen percent of chord from the leading edge and extending to the internal channel.

11. The air cycle machine of claim 1, wherein the internal channel is of a greater diameter than each of the plurality of air outlets.

12. The air cycle machine of claim 2, further comprising:
a fan section comprising:
the ram air fan, and
a ram air scoop;
a turbine section comprising a turbine rotor;
a compressor section axially between the fan section and the turbine section, the compressor section comprising a compressor rotor;
a tied rod connected to the turbine rotor, the compressor rotor, and the integrally bladed rotor;
at least one bearing assembly supporting the tie rod relative to a stationary structure of the air cycle machine; and
a bleed air passage comprising:
a bleed air inlet in the turbine section;
a bleed air outlet in the fan section, wherein the bleed air outlet is fluidically connected to the inlet passage, and wherein the bleed air passage extends across the at least one bearing assembly.

13. An air cycle machine comprising:
a turbine section comprising a turbine rotor;
a compressor section comprising a compressor rotor;
a ram air fan section comprising:
an integrally bladed rotor, and
a ram air scoop,
wherein the integrally bladed rotor comprises:
a rotor disk comprising a rim extending circumferentially about a center axis, wherein the rim comprises an interior rim surface and an exterior rim surface radially outward from the interior rim surface relative the center axis;
a rotor blade extending radially outward from the exterior rim surface of the integrally bladed rotor, wherein the rotor blade comprises:
a body extending from a leading edge to a trailing edge;
a pressure surface formed on the body and extending from the leading edge to the trailing edge; and
a suction surface formed on the body opposite of the pressure surface and extending from the leading edge to the trailing edge;
an internal channel inside of the body of the rotor blade and extending radially within the rotor blade; and
a plurality of air outlets formed proximate the leading edge of the rotor blade and extending into the body and fluidically connected to the internal channel; and
a tie rod connected to the turbine rotor, the compressor rotor, and the integrally bladed rotor.

14. The air cycle machine of claim 13, further comprising:
at least one bearing assembly supporting the tie rod relative to a stationary structure of the air cycle machine; and
a bleed air passage comprising:
a bleed air inlet in the turbine section;
a bleed air outlet in the fan section, wherein the bleed air outlet is fluidically connected to the internal channel, and wherein the bleed air passage extends across the at least one bearing assembly.

15. The air cycle machine of claim 14, further comprising:
an inlet passage formed in the rotor disk, wherein the inlet passage extends from the internal channel to a side surface of the rotor disk radially between the interior rim surface and the exterior rim surface, and wherein the inlet passage fluidically connects the bleed air passage to the internal channel.

16. The air cycle machine of claim 15, wherein the plurality of air outlets comprises:
a first air outlet on the leading edge and extending to the internal channel;
a second air outlet on the suction surface within fifteen percent of chord from the leading edge and extending to the internal channel; and
a third air outlet on the pressure surface within fifteen percent of chord from the leading edge and extending to the internal channel.

17. The air cycle machine of claim 15, wherein at least one air outlet of the plurality of air outlets is on the leading edge.

18. The air cycle machine of claim 15, wherein at least one air outlet of the plurality of air outlets extends from the internal channel to the pressure surface within fifteen percent of chord from the leading edge.

19. The air cycle machine of claim 15, wherein at least one air outlet of the plurality of air outlets extends from the internal channel to the suction surface within fifteen percent of chord from the leading edge.

* * * * *